United States Patent [19]

Araki et al.

[11] Patent Number: 4,974,779
[45] Date of Patent: Dec. 4, 1990

[54] SCREEN FORMING APPARATUS AND METHOD

[75] Inventors: Toshimitsu Araki, Musashino; Fumihiko Kawamata, Chiba; Masayuki Ogino, Toyko; Hitoshi Miyagawa, Kanagawa; Toshio Kamata, Tokyo; Mitsuo Watanabe, Funabashi; Kunihiro Miyashita, Tokyo, all of Japan

[73] Assignee: Ishikzwajima-Harima Heavy Industries Co., Ltd., Tokyo, Japan

[21] Appl. No.: 337,009

[22] Filed: Apr. 12, 1989

[30] Foreign Application Priority Data

Apr. 14, 1988 [JP] Japan .................................. 63-90410
Sep. 12, 1988 [JP] Japan .................................. 63-226390
Jan. 31, 1989 [JP] Japan .................................. 1-19809
Jan. 31, 1989 [JP] Japan .................................. 1-19810
Feb. 3, 1989 [JP] Japan .................................. 1-23816

[51] Int. Cl.⁵ .............................................. B05B 1/04
[52] U.S. Cl. ........................................ 239/18; 239/20; 239/557; 239/566; 239/DIG. 1
[58] Field of Search ..................... 239/17, 18, 20, 550, 239/556, 557, 566, 567, DIG. 1

[56] References Cited

U.S. PATENT DOCUMENTS

| | | | |
|---|---|---|---|
| 1,747,377 | 2/1930 | Maxon | 239/18 X |
| 2,302,021 | 11/1942 | Freeman | 239/557 X |
| 2,964,248 | 12/1960 | O'Brien et al. | 239/556 X |
| 3,030,028 | 4/1962 | Hruby | 239/17 |
| 3,334,816 | 8/1967 | Mizuno | 239/18 |
| 4,252,276 | 2/1981 | Aprea et al. | 239/DIG. 1 X |

Primary Examiner—Andres Kashnikow
Assistant Examiner—William Grant
Attorney, Agent, or Firm—Dykema and Gossett

[57] ABSTRACT

A screen forming apparatus and method comprises a long pipe of predetermined length floatable in the water, a pump for conveying the water through the pipe, a pipe connecting the pipe with the pump, an air-water device provided with the pipe for mixing the water with air, a number of nozzles disposed along the longitudinal direction of the pipe at predetermined intervals for injecting the water in the form of screen, and a device for producing air curtains flowing along the front and the rear surfaces of the screen in order to maintain the screen substantially uniform in thickness.

23 Claims, 6 Drawing Sheets

SCREEN FORMING APPARATUS AND METHOD

BACKGROUND OF THE INVENTION

1. Technical Field

The present invention relates to a novel screen forming apparatus and method, and in particular to a screen forming apparatus and method for forming a water screen, on which an image or reflections are projected, in an open area on or above the water, such as the sea, a lake or a river by pumping up and spraying the water.

2. Background Art

Outdoor movie theaters are, of course, well known. In such a theater, a solid movie screen is installed in the open air and a movie is projected thereon. The screen used for the outdoor movie theater is a sheet or a board which is similar to the screen used for the indoor movie theaters. The sheet or the board screen is hung down from or expanded over a supporting structure such as a scaffold of a predetermined height and width. The conventional outdoor movie theater usually has a projection screen standing on the ground with a screen size large enough to entertain an audience with the movies.

A large supporting structure is required to hold a large screen, and considerable labor is required in assembling/disassembling such a supporting structure. Also, the conventional outdoor theater occupies a large space for both the screen and the audience since the screen requires certain construction around it, and there must therefore be some distance between the screen and the audience.

There has been a suggestion to establish an outdoor movie theater which has a screen standing on water with the audience having seats on the ground near the water. However, it is difficult to support the ordinary, large screen that is used in the indoor theaters on or above the water which may be in the form of a sea, lake, river or pool. Thus, heretofore only a small-size screen could be employed for the on-the-water-screen theater.

SUMMARY OF THE INVENTION

One purpose of the present invention is to provide a liquid screen forming apparatus for forming a large fluid projection screen on and above the surface of any area of water or the ground, so that a large outdoor movie theater or an advertisement installation can be built at a place, for instance, at the seaside or along a riverside.

Another purpose of the present invention is to provide a screen forming apparatus for forming a projection screen defined by a liquid curtain having good projection qualities.

Still another purpose of the present invention is to provide a screen forming apparatus for forming a gaseous screen which is easy to handle and has a uniform quality in reflecting images sent from the projector so that the audience can enjoy clear vision.

Yet another purpose of the present invention is to provide a screen forming apparatus for establishing a screen of liquid which is uniform in thickness and is capable of creating an atmosphere different from indoor movie theaters.

According to the first aspect of the present invention, there is provided a unique screen forming apparatus and method which comprises a water pipe of predetermined length, a water pump for supplying water to the water pipe, a number of first type nozzles fixed on the water pipe at regular intervals in the longitudinal direction of the pipe for forming plural, pie-shaped like water curtains (screens) by spraying the water supplied from the pump and a number of second type nozzles respectively placed between each two first type nozzles for forming plural, fan-shaped like water curtains. According to this water screen forming apparatus, water compressed by the pump is sent into the water pipe and then sprayed from both the first and second water nozzles, so that a water screen of predetermined size is created which extends along the lengthwise direction of the water conveyance pipe. When the water conveyance pipe is set on the water and the water pump starts supplying the water to the pipe, a large projection screen appears on the surface of the water. By providing a gas-water mixing device, for instance an air-water mixing device for mixing air bubbles with the water prior to sending the water to the pipe, there is created a whitish, smog-like screen since air-bubble-containing water is sprayed from the nozzles. Such a screen possesses a very low light transparency quality and a large light-scattering quality, so that a clear projected image can be expected thereon.

In accordance with a second aspect of the present invention, there is provided another screen forming apparatus and method which comprises a gas ejection pipe equipped with gas nozzles for injecting whitish gas made from dry ice or the like and a gas suction pipe so placed as to be opposed to the gas ejection nozzles for sucking the ejected gas, forming a projection screen between the gas ejection nozzles and the gas suction pipe. In this screen forming apparatus, whitish gas ejects to the gas suction pipe. Gas so ejected is sucked into the gas suction pipe, thereby forming a gaseous curtain or screen between the gas ejection pipe and the gas suction pipe. Unlike the last mentioned screen forming apparatus, the working medium such as water does not splash about in this apparatus. Therefore, the selection range in installing the screen forming apparatus is widened.

According to a third aspect of the present invention, still another screen forming apparatus and method is provided, which apparatus comprises a water pipe for spraying water containing fluorescent dye and air ejection pipes so placed as to sandwich the water pipe between them, thereby forming an air curtain flowing along the front and the back faces of the water curtain and keeping the thickness of the screen substantially constant. According to this apparatus, fluorescent dye is contained in the ejected water, so that the light from the projector is reflected clearly. Also, since the air ejection pipes are arranged in parallel relation with the water curtain (screen) forming pipe, and inject air or form air curtains which sandwich the water screen, the water screen is maintained substantially constant in thickness and the water does not disperse, even at the region spaced from the nozzles.

BRIEF DESCRIPTION OF THE DRAWINGS

FIGS. 1 to 10 illustrate a first embodiment, FIGS. 11 to 13 illustrate a second embodiment and FIGS. 14 and 15 illustrate a third embodiment of the present invention, respectively. Specifically:

DESCRIPTION OF THE PREFERRED EMBODIMENTS

Now preferred embodiments of the present invention will be described with reference to the accompanying drawings.

Embodiment 1

Figure 1:
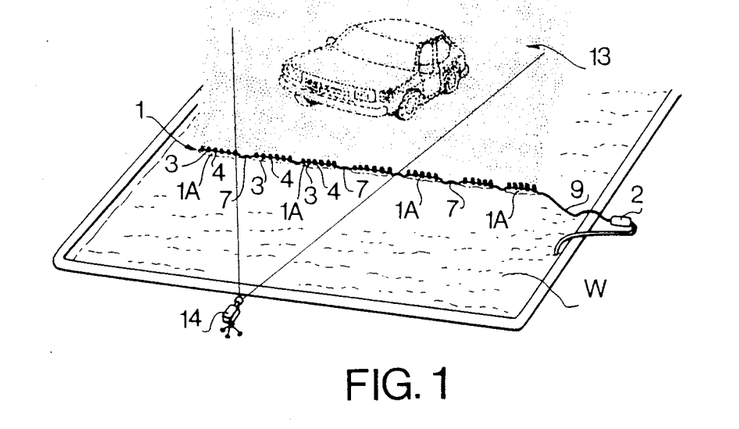
FIG. 1 shows a schematic view of a projection carried out using the screen forming apparatus of the first embodiment.
Figure 2:
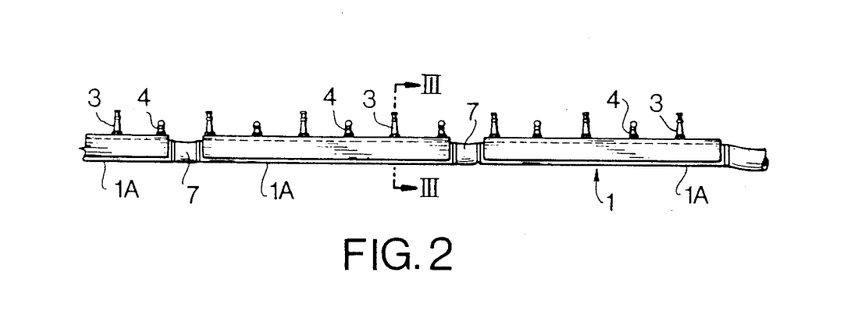
FIG. 2 is an enlarged view of a part of the water conveyance pipe shown in FIG. 1.

As shown in FIG. 1, a screen forming apparatus mainly includes a water conveyance pipe 1 of predetermined length which floats and is held on a water body surface W of, for example, a swimming pool, a water supply pump 2 for sucking up the water in the pool and supplying water under pressure to the water conveyance pipe 1, a plurality of first water spray nozzles 3 and second water spray nozzles 4, respectively installed on the water conveyance pipe 1. The length of the water pipe 1 is determined in accordance with that of a desired projection screen 13. Referring to FIG. 2, the water pipe 1 is constituted by a plurality of pipe segments 1A made of metallic or plastic material. The pipe segments are connected to each other by flexible joint pipes 7. Returning to FIG. 1, the water supply pump 2 is placed at poolside. An intermediate pipe 9 is connected to a discharge portion of the water pump 2 at one end thereof, and the same is connected to an inlet opening of the water pipe 1 at the other end.

Figure 4:
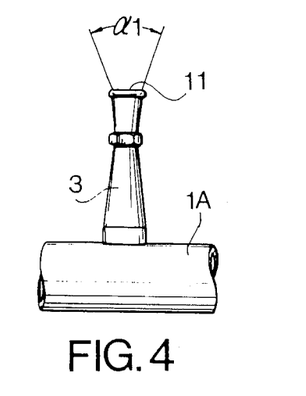
FIG. 4 is a schematic view showing a first water nozzle of FIG. 3.
Figure 5:
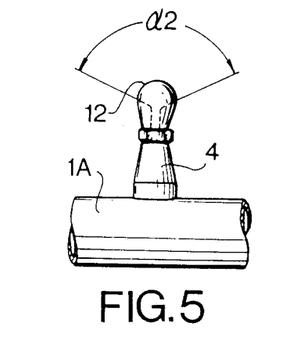
FIG. 5 schematically illustrates a second water nozzle of FIG. 3.
Figure 6:
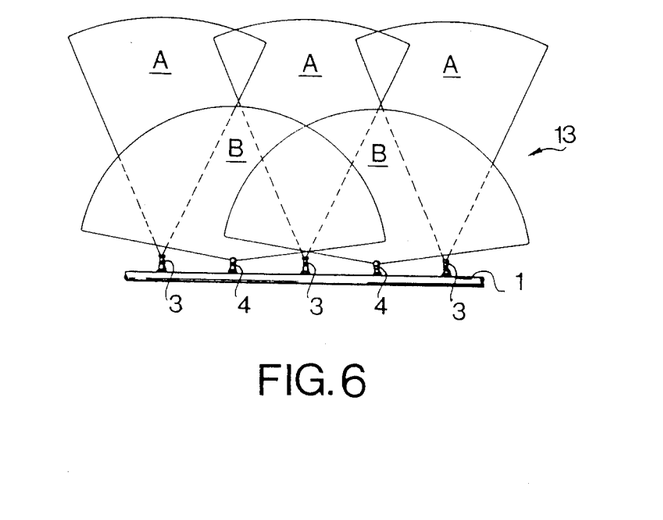
FIG. 6 illustrates an outline of the water curtain defined by the apparatus of FIG. 1.

Referring to FIG. 6, the first set of water spray nozzles 3 are placed spaced from each other in the longitudinal direction of the pipe 1 such that each first nozzle 3 spouts water upward creating a piece-of-the-pie-like water screen A above the pipe 1 while the second set of water spray nozzles 4 are placed between each two first nozzles 3 such that they create fan-like water screens B between the screens A. The heights of the screens A and B depend on the water pressure given by the pump 2, and the pump capacity is determined in accordance with the size of the screen desired. The first nozzle 3, as illustrated in FIG. 4, has a water injection portion 11 whose water spraying angle α1 is about 20 degrees and the second nozzle 4, as illustrated in FIG. 4, has a water injection port 12 whose water spraying angle α2 is about 170 degrees. Returning to FIG. 6, the first nozzle 3 creates the water screen A taller than the water screen B created by the second nozzle 4. Also, the second nozzles 4 are positioned so as to form the water screens B in front of the water screens A. Therefore, the water curtains B are respectively formed between each two water curtains A in a manner such that the former curtains B cover the vacant spaces between the latter curtains A, i.e., the combination of two types of screens define one large screen 13 over the water pipe 1 along its longitudinal direction.

Figure 3:
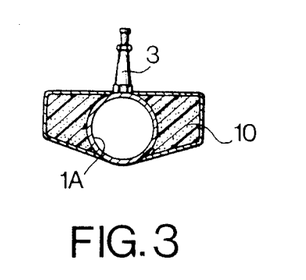
FIG. 3 is a sectional view along the line III—III of FIG. 2.

As illustrated in FIG. 3, each pipe segment 1A is provided with a buoyant member 10 along the longitudinal direction thereof, so that the water pipe 1 can float in the water. Where the projection screen 13 is to be made over the water of a swimming pool as shown in FIG. 1, the water conveyance pipe 1 is set on the water, and then the water pump 2 is switched on for pumping up the pool water into the pipe 1. Water thusly supplied to the pipe 1 is ejected upward from the first and the second nozzles 3 and 4, thereby creating the water screen 13. In this case, water becomes small droplets as it spreads from the nozzles and mixes with the air, so as to form a fog-like screen. Accordingly, such a screen possesses a low light transparency quality as well as a large light-scattering quality. When the screen 13 is formed over the swimming pool water W, the projector 14 which is placed poolside a proper distance from the screen is started, sending the image to the screen 13. Sound required for the projected image is provided by speaker sets (not shown) disposed near the pool. Therefore, created is an outdoor theater having a mood which is different from the conventional outdoor theaters, and it is possible to entertain a large audience with a unique effect.

Figure 7:
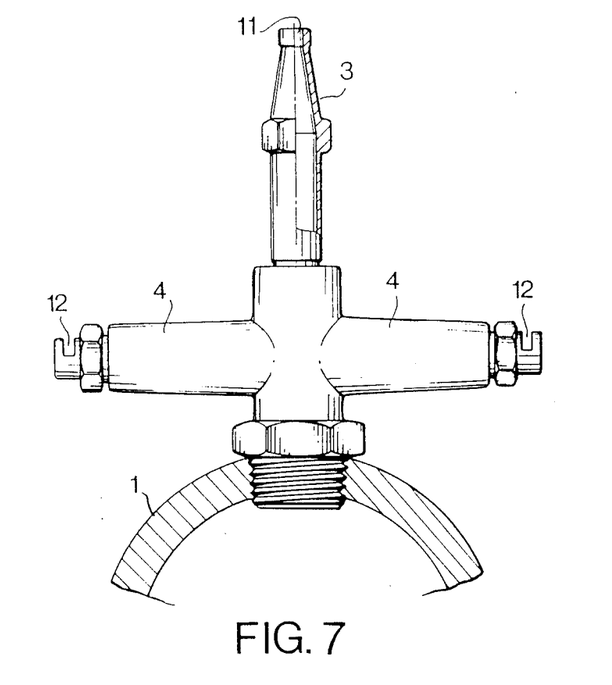
FIG. 7 is a fragmentary sectional view showing another water nozzle.

As illustrated in FIG. 7, the second nozzles 4 may be disposed at the front and the rear of the first nozzle 3 such that the water screens B are formed at the front and the rear of the water screen A.

Figure 8:
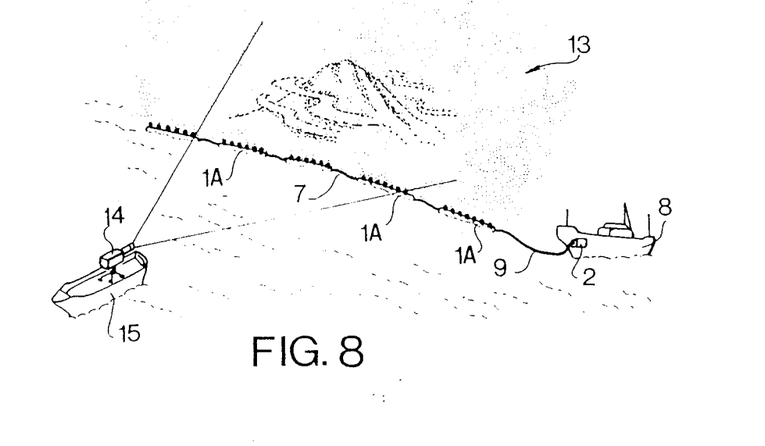
FIG. 8 is a modification apparatus of FIG. 1.

FIG. 8 depicts a case where the water screen is formed on a sea, lake or river. The water pump 2 is disposed in a ship 8 which holds the water supply pipe 1. The projector 14 is placed in another ship 15 spaced from the water screen 13 a proper distance. Alternatively, the projector 14 may be set on the ground such as the seashore. The sound for the image may be produced by a speaker set installed on the ship 15 or the seashore.

Figure 9:
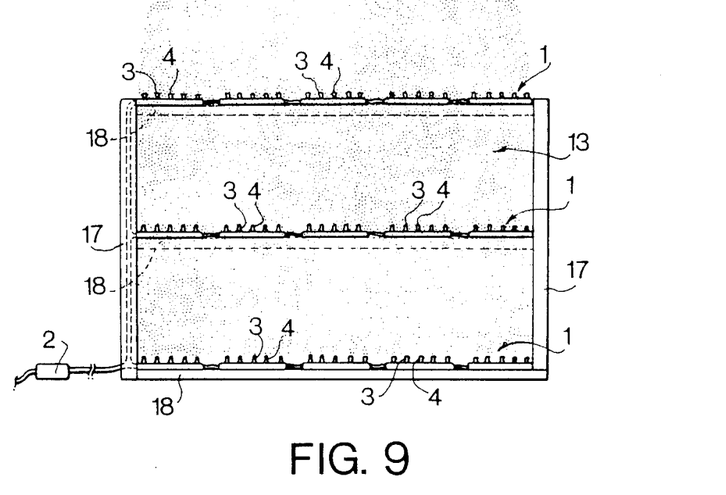
FIG. 9 is another modification of FIG. 1.

A much higher screen can be built by several water conveyance pipes 1 arranged like a ladder as illustrated in FIG. 9. In this case, a couple of vertical poles 17 stand on the ground, with horizontal bars 18 spanning therebetween. The water pipes 1 are supported by the horizontal bars 18. As the water is supplied to the pipes 1 by the pump 2, a water screen 13 of considerable height is created. Each set of the horizontal bars 18, the water conveyance pipe 1, and the water nozzles 3 and 4 hide behind the water screen created by the other set just below, so that only the lowermost horizontal bar 18 and the pipe 1 are apparent to the audience, making a very tall screen.

Figure 10:
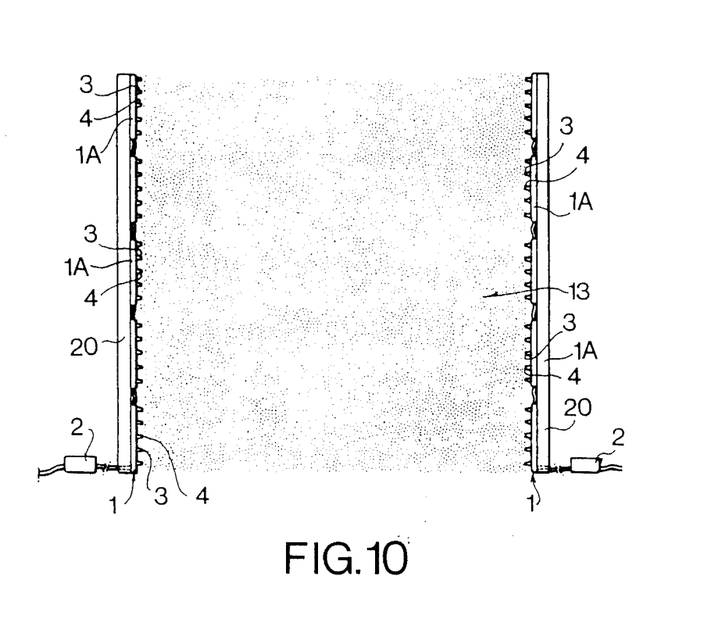
FIG. 10 is still another modification of FIG. 1.

The water nozzles 3 and 4 may spout water also in horizontal directions as depicted in FIG. 10. The water pipes 1 extend vertically along the supporting poles 20 standing on a ground.

In the above embodiment, only two types of nozzles 3 and 4 are employed. However, other types of nozzles may be provided, for instance, a bar-like nozzle which injects water higher and in a narrower angle than the first nozzle 3 in order to create a larger screen. Also, the first nozzles are not necessarily provided with the second nozzles, i.e., the first nozzles may be associated with the bar-like nozzles only.

Embodiment 2

A second embodiment of the present invention will now be described with reference to FIGS. 11, 12 and 13.

Figures 11, 12:
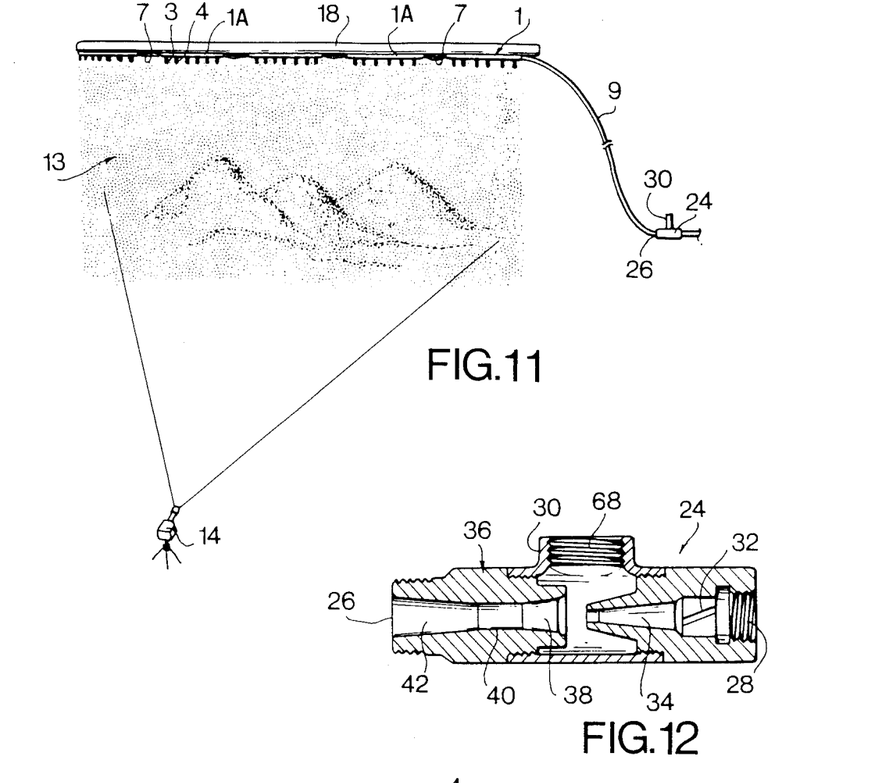
FIG. 11 depicts an overall view of a projection using a screen forming apparatus according to a second embodiment.
FIG. 12 is a sectional view of an ejector of FIG. 11.

The water conveyance pipe 1 in the screen forming apparatus of this particular embodiment ejects water downward for forming a water screen 13 under the water conveyance pipe 1 as illustrated in FIG. 11. This apparatus includes a horizontal supporting member 18, a water curtain forming pipe 1 mounted on the supporter 18 for ejecting water downward and an ejector 24 for blending water with gaseous substance such as air, so as to generate a projection screen of air-bubble-containing water. The ejector 24 may be an air-water mixing device. Meantime, the water pipe 1, the pipe segments 1A, the joint pipe 7, the first nozzle 3 (nozzle angle 1 is also approximately 20 degrees) and the second nozzle 4 (nozzle angle 2 is also approximately 170 degrees) are almost the same as those described in the first embodiment, and thus these elements need not be further described here. The only difference to be noted may be that the pipe segment 1A is not provided with the buoyant member since the pipe 1 does not float in this embodiment.

An intermediate pipe 9 is connected to the inlet of the water curtain pipe 1 at one end thereof and to the discharge port 26 of the ejector 24 at the other end thereof. Referring now to FIG. 12, the ejector 24 has a cylindrical shape and possesses an inlet portion 28 at one end thereof and an outlet port 26 at the other end thereof. A suction pipe 30 which defines a suction portion 68 for introducing the gaseous substance such as air is attached to the ejector 24 at the central part thereof. Inside the ejector 24, there is formed a nozzle section (throttling section) 34 at the upstream side (right-hand side in the drawing), and provided therein is a swirl blade 32 for injecting fluid such as water coming through the inlet port 28. At the downstream side in the ejector 24 there is defined a mixing section 36 for mixing the fluid ejected from the nozzle section 34 and gaseous substance sucked through the suction pipe 30. The mixing section 36 includes three continuous chambers, namely a mixing chamber 38 having a bore gradually reduced in diameter along the fluid flowing direction, a parallel chamber 40 of a uniform bore, and a diffusing chamber 42 having a bore gradually expanded from the parallel chamber 40.

When a harmless fluorescent dye is mixed with water and supplied to the inlet port 28 of the ejector 24, the mixture is ejected into the mixing chamber 38 from the nozzle section 34 by the swirl blade 32. Then, air is sucked through the suction pipe 30 into the mixing chamber 38 due to negative pressure in the mixing chamber 38 by the jet stream of the mixture and, as a result, it enters into the parallel chamber 40 together with the mixture. While flowing through the mixing chamber 38 and the parallel chamber 40, the air so introduced and the fluorescent dye-water mixture are blended, whereby water containing air bubbles and fluorescent dye is obtained. Such a mixture regains pressure as it flows through the diffuser chamber 42 and is then discharged from the discharge port 26, which is in turn supplied to the water pipe 1 via the connecting pipe 9. After being conveyed to the water pipe 1, the water containing air bubbles is spouted downward from the first nozzles 3 as well as the second nozzles 4, thereby creating a whitish, foggy screen 13 which scatters or at least hardly transmits the light.

Figure 13:
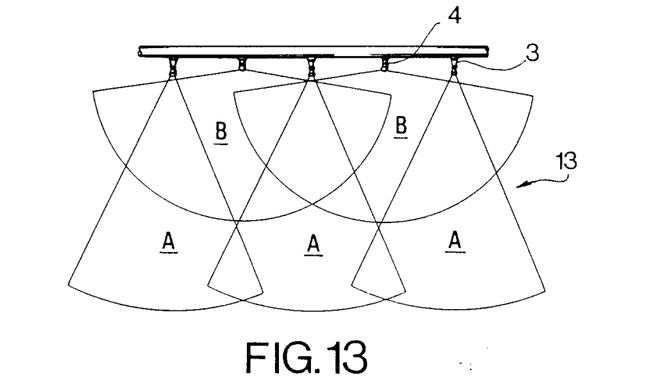
FIG. 13 is a conceptual view of the water screen defined by the apparatus of FIG. 11.

Referring to FIG. 13, the screen 13 is formed by the water curtains A and B. The water ejected from the first set of nozzles 3 defines the water curtains A at a relatively low part of the screen 13, whereas the water ejected from the second set of nozzles 4 defines the other water curtains B at a relatively high part of the screen 13 between each two water screens A. That is, the water curtain B covers the upper vacant space between each two water curtains A, so as to define a single screen 13. Since the fluid injected from the pipe 1 contains fluorescent dye, the reflection generated on the screen 13 is clear. The fluorescent dye added to the water is, of course, harmless.

Embodiment 3

Now, a third embodiment of the present invention will be explained with reference to FIGS. 14 and 15.

Figure 14:
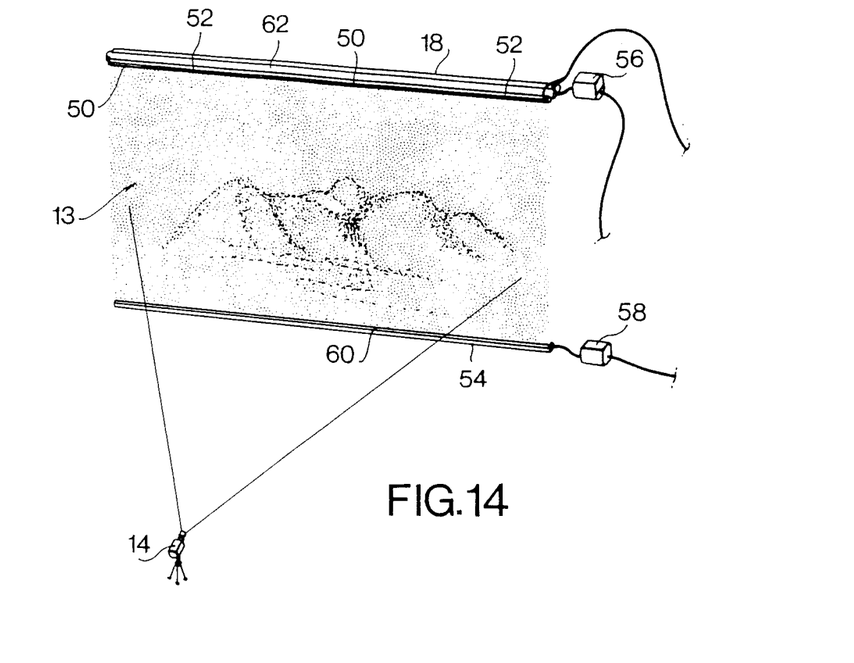
FIG. 14 depicts an overall view of a projection using a screen forming apparatus according to a third embodiment.
Figure 15:
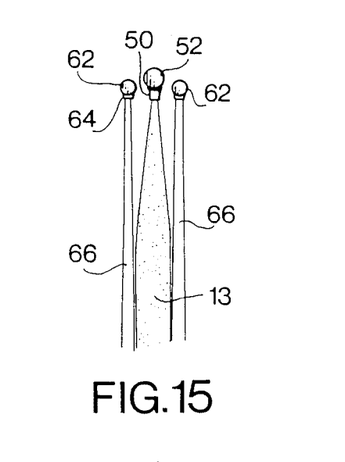
FIG. 15 is a schematic view showing an arrangement of the gas injection pipe, the air injection pipe, and air curtains formed by these pipes.

As shown in FIG. 14, the screen forming apparatus includes a supporter 18 held above substantially in a horizontal position, a gas ejection pipe 52 attached to the underside of the supporter 18 and provided with a gas ejection nozzle 50 for jetting whitish and less-transparent gas made from harmless gas such as dry ice, and a suction pipe 54 spaced from and facing the gas ejection pipe 52 with a predetermined clearance for sucking the gas from the ejection pipe 52.

The length of the gas ejection pipe 52 is determined according to the length of the gaseous screen 13 to be desired. A pump 56 for conveying the whitish gas such as dry ice under predetermined pressure is joined to the inlet of the gas ejection pipe 52. The gas ejection nozzle 50 is disposed on the lower face of the gas ejection pipe 52 along the longitudinal direction of the pipe 52 so as to eject gas downwardly. Beneath the gas ejection pipe 52, there is disposed a suction pipe 54 parallel to and spaced from the gas ejection nozzles 50 by a predetermined distance. The suction pipe 54 has substantially the same length as the gas ejection pipe 52. A suction port 60 is formed along the upper face of the suction pipe 54, and a suction device 58 for sucking the gas into the suction pipe 54 is connected to one end of the suction pipe 54, so that the lower pipe 54 sucks the gas ejected from the upper pipe 52, thereby defining a gaseous projection screen 13 therebetween. Referring to FIG. 15, there are provided air ejection pipes 62 which are mounted on the supporter 18 and extend parallel with the ejection pipe 52. These air ejection pipes 62 are separated from the ejection pipe 52 by an equal distance (the supporter 18 is not shown in FIG. 15). The air ejection pipes 62 are also provided with nozzles 64 for forming air curtains. In other words, the air ejected from the air ejection nozzles 64 produces the air curtains 66 which flow along the front and the rear faces of the gaseous curtain formed between the gas ejection nozzle 50 and the suction port 60. The air curtains 66 sandwich the gaseous screen 13 so that they prevent the substance from dispersing, thereby maintaining the screen 13 uniform in thickness. An air suction pipe (not shown) is provided along the lower pipe 54 so as to produce stronger air curtains for more reliably confining the gas screen 13.

The whitish gas made of harmless dry ice is compressed to the gas ejection pipe 52 by the pump 56 and then ejected from the nozzle 50 of the pipe 52 toward the suction port 60 of the suction pipe 54. The interior of the suction pipe 54 is under a negative pressure due to a suction device 58. Therefore, the gas from the upper pipe 52 is effectively sucked into the lower pipe 54. Accordingly, a whitish, uniform-in-thickness gaseous screen 13 is produced. As a result, even persons in the audience having seats not in front of the screen 13 or having a small viewing angle relative to the screen 13 also enjoy a clear picture.

A screen of different size is also formed by changing the distance between the two pipes 52 and 54 as well as the gas pressure sent to the gas ejection pipe 52. In other words, the size of the screen 3 can change frequently. Because the projection screen 13 is made of harmless, whitish gas of, for example, dry ice, there is no danger to the audience. Accordingly, only a small number of elements are necessary to establish the gaseous screen 13, i.e., the screen 13 can be built almost anywhere in a simple manner. For example, this type of screen 13 may be utilized even in an indoor theater. In this case, since the screen 13 is formed by ejecting and sucking the working fluid, and it is easy to let it appear and disappear in a quick manner, the audience is amused with an atmosphere different from the ordinary indoor theaters.

In the last-mentioned embodiment, the gas is injected downward. However, it is not a limitation in carrying out the present invention. For instance, any arrangement of the gas injection suction pipes is satisfactory as long as they are spaced by a proper distance, and one of them injects the gas while the other sucks the same, so as to form a screen therebetween. One simple example is an arrangement in which the pipes 52 and 54 stand vertically, and the gas is supplied horizontally. Furthermore, where the distance between the gas ejection pipe 52 and the suction pipe 54 is small or the sucking pressure of the suction pipe 54 is sufficiently high, the elements for forming the air curtains are not necessary since the gas ejection pipe 52 and the suction pipe 54 produce a decent screen. Moreover, the working fluid is not limited to whitish gas such as dry ice. For instance, water mixed with the fluorescent dye in the order of several ppm may be employed. In this case, the gas ejection pipe 52 and the suction pipe 54 will be replaced by a water ejection pipe and a water receiving pipe.

We claim:

1. A screen forming apparatus comprising:
   a pipe of a predetermined length;
   a pump for conveying a working fluid under pressure to said pipe; and
   a plurality of nozzles of rejecting working fluid so as to form a screen, said nozzles being placed along the longitudinal direction of said pipe at predetermined intervals, said plurality of nozzles including two sets of nozzles and being arranged in a manner such that the working fluid ejected from one set of the nozzles reaches a region beyond the region to which the working fluid is ejected from the other set of nozzles.

2. A screen forming apparatus as set forth in claim 1, wherein a screen of working fluid ejected from one set of nozzles is formed at one of the front and rear of a screen formed by the working fluid ejected from the other set of nozzles.

3. The screen forming apparatus as set forth in claim 2, wherein said nozzles include two sets of nozzles and a screen of working fluid ejected from one set of nozzles is formed at the front of the rear of the screen formed by the working fluid ejected by the other set of nozzles, thereby creating double screens.

4. A screen forming apparatus as set forth in claim 3, wherein said pipe includes a plurality of segments connected to each other by flexible pipes.

5. A screen forming apparatus as set forth in claim 4, wherein said segments are provided with buoyant members for allowing said segments to float in the water.

6. The screen forming apparatus as set forth in claim 2, wherein said nozzles include two kinds of alternatively arranged nozzles, the nozzles of one kind having an ejection angle larger than that of the other kind.

7. A screen forming apparatus as set forth in claim 2, wherein said pipe includes a plurality of segments connected to each other by flexible pipes.

8. A screen forming apparatus as set forth in claim 7, wherein said segments are provided with buoyant members for allowing said segments to float in the water.

9. A screen forming apparatus as set forth in claim 8, wherein said working fluid is water.

10. A screen forming apparatus as set forth in claim 1, wherein said nozzles include two sets of nozzles and a screen of working fluid ejected from one set of nozzles is formed at the front or the rear of the screen formed by the working fluid ejected from the other set of nozzles, thereby creating double screens.

11. The screen forming apparatus as set forth in claim 10, wherein said nozzles include two kinds of alternatively arranged nozzles, the nozzles of one kind having an ejection angle larger than that of the other kind.

12. A screen forming apparatus as set forth in claim 11, wherein said pipe includes a plurality of segments connected to each other by flexible pipe.

13. A screen forming apparatus as set forth in claim 12, wherein said segments are provided with buoyant members for allowing said segments to float in the water.

14. A screen forming apparatus as set forth in claim 13, wherein said working fluid is water.

15. A screen forming apparatus as set forth in claim 1, wherein said nozzles include tow kinds of alternatively arranged nozzles, the nozzles of one kind having an ejection angle larger than that of the other kind.

16. A screen forming apparatus as set forth in claim 1, wherein said pipe includes a plurality of segments connected to each other by flexible pipe.

17. A screen forming apparatus as set forth in claim 16, wherein said segments are provided with buoyant members for allowing segments to float in the water.

18. A screen forming apparatus as set forth in claim 17, wherein said working fluid is water.

19. A screen forming apparatus as set forth in claim 1, wherein said working fluid is water.

20. A screen forming apparatus as set forth in claim 19, wherein said working fluid further contains fluorescent dye.

21. A screen forming apparatus as set forth in claim 1, wherein said working fluid is water, and said screen forming apparatus further includes an air-water mixing device for mixing water with air prior to injection through said nozzles.

22. A screen forming apparatus as set forth in claim 21, wherein said air-water mixing device comprises:
   a body provided with a round, water inlet port, an air introduction port, and a round, water-air discharging port;
   a nozzle section defined in said body and gradually reduced in diameter from said water inlet port in the direction toward said water-air discharging port, air introduced through said air introduction port being supplied to the downstream end of the nozzle section;

a swirl blade provided in the body;

a mixing chamber defined in the body, spaced from the nozzle section in the direction toward the discharging port and gradually reduced in diameter for mixing water supplied from said nozzle section with air introduced through said air introduction port;

a parallel chamber defined in the body and continuous from the mixing chamber toward the discharging port with a constant diameter; and a diffuser section defined in the body, continuous from the parallel chamber to the discharging port and progressively enlarged in diameter for discharging a water-air mixture from the body.

23. A screen forming apparatus as set forth in claim 1, wherein said pipe is vertically positioned to spout working fluid horizontally, and the apparatus further comprises:

a second pipe of predetermined length positioned parallel to said pipe;

a second pump for conveying said working fluid under pressure to said second pipe; and a plurality of second nozzles installed along the longitudinal direction of said pipe at said predetermined intervals, facing said plurality of nozzles, so as to spout said working fluid horizontally and form another screen of the working fluid in a manner such that a single larger screen is formed by the screen formed by said pipe and said another screen formed by said second pipe.

* * * * *

UNITED STATES PATENT AND TRADEMARK OFFICE
CERTIFICATE OF CORRECTION

PATENT NO. : 4,974,779

DATED : December 4, 1990

INVENTOR(S) : ARAKI, Toshimitsu, et al.

It is certified that error appears in the above-identified patent and that said Letters Patent is hereby corrected as shown below:

Column 7, line 51, change "of rejecting" to --for ejecting--.

Column 8, line 41, change "tow" to --two--.

Signed and Sealed this

Fifteenth Day of December, 1992

Attest:

DOUGLAS B. COMER

Attesting Officer  Acting Commissioner of Patents and Trademarks